United States Patent Office 2,868,732
Patented Jan. 13, 1959

2,868,732

COMPOSITIONS OF MATTER FOR CLEANING METAL BODIES

Jean Gabriel Truc, Toulon, France, assignor to Etat Français, Ministere de la Defense Nationale & des Forces Armees, Paris, a society of France No Drawing. Application May 9, 1955
Serial No. 507,145

Claims priority, application France May 17, 1954

2 Claims. (Cl. 252—136)

The present invention relates to compositions, including at least one acid, preferably a mineral one, and a colloidal support, for cleaning the surface of metal bodies, in particular for removing scale as formed on metal sheets as a result of rolling operations, heat treatment, etc., and also for removing rust, grease and other impurities from the surface of metal sheets.

The chief object of this invention is to provide a composition of matter of the above mentioned type which is better adapted to meet the requirements of practice than those used up to the present time.

The composition of matter according to the present invention is characterized by the fact that it comprises, in addition to the acid and the colloidal support, a resin soluble in said acid and adapted to give the film obtained by spreading this product on a surface to be cleaned a structure such that this film can be peeled off from said surface.

The necessity of quickly cleaning metal sheets occurs often in industry and in particular in the case of metal sheets of a thickness lower than 10 mm. Such sheets are most employed for various purposes so that they do not remain stored up for a very long time in open places where atmospheric agents would finally remove scale therefrom. As a rule, the removal of this scale is obtained by immersing the sheets in acid solutions. However this method requires large installations which are not always available.

In order to obviate this drawback, I make use of a composition of matter according to the present invention which is applied on the surfaces to be treated so as to form thereon a coating or film which can be subsequently removed after a suitable time so as to leave the surfaces quite free from scale and other impurities.

Such a composition of matter includes active substances incorporated in a colloidal support of relatively viscous consistency, consisting for instance of a colloidal gel and in particular of colloidal clay such as bentonite.

The active substances which are capable of removing rust, scale and other impurities consist of at least one acid, and preferably a strong mineral acid such as hydrochloric acid, to which may be added phosphoric acid or the like.

As a rule, it is advantageous to add some amount of a body acting as a reductor. For instance, if hydrochloric acid is used, this acid, after it has removed superficial oxides and impurities, dissolves the underlying metal itself and produces ferrous chloride which has a tendency to oxidize. The formation of ferric chloride then activates the dissolution of iron. This drawback is avoided by making use of a reductor body which may be constituted advantageously by stannous chloride.

On the other hand, it is generally advantageous to incorporate in the composition inhibitors to reduce the attack on metal. In the case of an acid composition as above stated, such an inhibitor may be constituted by antimony oxide in proportions ranging for instance from 0.2 to 0.5%.

An essential element of the composition of matter according to the present invention is constituted by at least one substance capable of making the film or layer obtained by spreading this composition on the surface to be treated such that it can be removed from said surface, after treatment, by peeling it off. According to my invention, this substance is constituted by a resin, and in particular a polyvinyl resin capable of dissolving in the acid or acids that are used, and in particular in hydrochloric and phosphoric acids. For instance, I will make use of the polyvinyl alcohol resin called "Rhodoviol H. S. 10," made in France by the firm Rhône-Poulenc.

Concerning the proportions of the components, they may vary within a wide range, but the following proportions (by weight) seem to be particularly advantageous:

| | |
|---|---|
| Hydrochloric acid of 22° Bé | 53 |
| Stannous chloride | 2 |
| Polyvinyl alcohol resin | 2 |
| Attack inhibitor | 0.5 |
| Bentonite | 42.5 |
| | 100 |

For preparation of the composition, stannous chloride is dissolved in hydrochloric acid, then the resin is added and dissolves slowly (in some hours provided that it is stirred intermittently). Then bentonite is added as slowly as possible while the mixture is being stirred.

The product that is obtained looks like a gel and has the following characteristics:

It can be easily transported because there is but little liquid acid on the surface of the product in the containers in which it is placed.

It is very stable owing to the bentonite which has a high gas absorbing power. Bentonite thus keeps hydrochloric acid gas from disengaging into the atmosphere if this atmosphere is saturated with water vapor.

It is thixotropic so that after it has been stirred up it can easily be applied by spreading by means of a brush.

Finally, once it has been applied to form a film or coating on the metal sheets, it fixes thereon the acid and other substances and thus performs the desired treatment within some hours, after which it can be removed by merely peeling it off from the surface treated.

In experiments that have been made with this composition of matter, the product was applied in the evening and it was generally removed on the next morning, that is to say after about seven hours. But this time may vary with the nature and the thickness of the scale to be removed, which thickness of course depends upon the heat treatment that has been applied to the metal sheets.

At the end of the operation, the composition is removed by merely peeling it off by means of a knife or the like. The surface is washed with water, brushed and again washed abundantly. The metal is uniformly white and bright. The surfaces must be well dried in order to prevent the formation of rust. If the metal is to be painted, this operation must be made immediately after drying of its surface.

The operators which apply such a composition of matter must wear rubber gloves. They may be provided with active carbon and alkaline masks because if the surrounding atmosphere is saturated with water vapor, there may be some gaseous acid disengaged into the atmosphere.

The containers in which the product is to be placed must be resistant to acid and for instance made of a plastic material.

The composition of matter according to the present invention is particularly advantageous in the case of metallic surfaces which are to be painted or repainted, as for instance on ships.

It will be noted that when it is not possible to clean the metallic surfaces by sand blasting, as it is the case for ship decks, the preparation of the metallic surfaces is generally obtained by scaling and brushing. Now, in the case of surfaces which are very much oxidized, it is not possible in this way thoroughly to clean them. Therefore there remains on the metal rust and greasy bodies which have been agglomerated by people walking thereon. In this case, cleaning by means of a rag impregnated with trichlorethylene is not sufficient. Paint applied on such a surface does not give good results.

In this case, to the acid of the product according to the present invention, which is capable of removing rust, it is necessary to add bodies for removing greasy substances, that is to say suitable solvents such as that called "Ortosol" in the market, and which consists chiefly of dichlorobenzene associated with monochlorobenzene. Such a solvent has the advantage over trichloroethylene of being much less volatile. It may thus penetrate inside the greasy layers which are to be disintegrated.

A composition of matter according to the present invention for use in such a case may advantageously be as follows:

| | |
|---|---|
| Hydrochloric acid of 22° Bé | 30 |
| Water | 10 |
| Stannous chloride | 1 |
| Phosphoric acid at 85% | 10 |
| Polyvinyl alcohol resin | 3 |
| "Ortosol" | 10 |
| Bentonite | 36 |
| | 100 |

These proportions may be varied in accordance with the amount of greasy substances and rust to be removed.

A composition of matter according to the present invention, when spread on the surface to be treated, fixes the solvent and the acid thereon and prevents them from flowing off. Furthermore it slows down the evaporation of solvent owing to the presence of bentonite which stabilizes the emulsion of solvent in the acid.

If the surface to be treated is to be treated with phosphate, in particular by means of a product such as that called "Parcodine" in the market, which contains water, it is not necessary to dry the surface after it has been treated; it suffices to reduce the dilution of the phosphate composition before applying it. The first coat of paint should be applied immediately after treatment.

According to an experiment made with such a composition of matter according to the present invention, three different areas of a ship deck which was oxidized and periodically coated with black-lead for improving the aspect thereof, were treated as follows:

(a) Degreasing and partial removal of black-lead with a rag impregnated with chlorethylene, (b) Same treatment but additional application of "Parcodine,"

(c) Part removal of black-lead with a rag and treatment with the composition according to the present invention.

After one week, the paint applied on the areas treated as indicated at (a) and (b) had been detached. On the third sample area it remained in quite good state two months after its application.

Since the basic paint layer thus obtained is resistant to wear, it suffices to renew from time to time finishing layers applied thereon.

In a general manner, while I have, in the above description, disclosed what I deem to be practical and efficient preferred examples of my invention, it should be well understood that I do not wish to be limited thereto.

What I claim is:

1. A composition for cleaning metal bodies consisting, essentially of 53% hydrochloric acid of 22° Bé, 2% stannous chloride, 2% polyvinyl alcohol resin, 0.5% antimony oxide and 42.5% bentonite, by weight.

2. A composition for cleaning metal bodies consisting essentially of 30% hydrochloric acid of 22° Bé, 10% water, 1% stannous chloride, 10% phosphoric acid of 85% strength, 3% polyvinyl alcohol resin, 10% grease solvent, 36% bentonite, by weight.

References Cited in the file of this patent

UNITED STATES PATENTS

| | | |
|---|---|---|
| 1,673,951 | Rogers | June 19, 1928 |
| 2,186,017 | Geng | Jan. 9, 1940 |
| 2,221,968 | Friedmann | Nov. 19, 1940 |
| 2,507,985 | Kuentzel | May 16, 1950 |
| 2,672,449 | Snell | Mar. 16, 1954 |